Aug. 20, 1946.    R. L. LEVY    2,406,303
SELF-COOLING WHEEL
Filed April 2, 1941
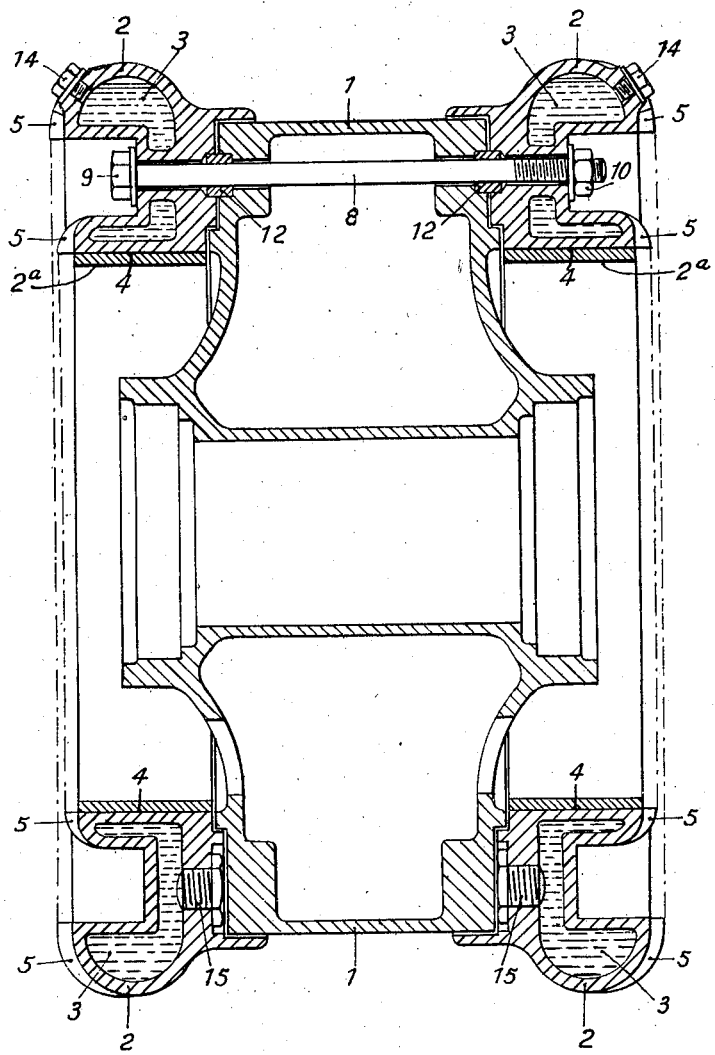

Patented Aug. 20, 1946

2,406,303

UNITED STATES PATENT OFFICE 2,406,303

SELF-COOLING WHEEL

René Lucien Levy, Paris, France, assignor to Societe D'Inventions, Aeronautiques et Mecaniques S. I. A. M., Fribourg, Switzerland Application April 2, 1941, Serial No. 386,553
In France April 2, 1940

1 Claim. (Cl. 301—6)

It is known that the braking of aeroplane wheels generates, for heavily loaded aeroplanes, quantities of heat the order of magnitude of which can be such that it necessitates a systematic cooling of said wheels.

For ensuring this cooling, it has already been proposed to provide, within the wheels, chambers containing a cooling liquid capable of absorbing, without prejudicial rise of temperature, the calories generated by the braking action.

The present invention is adapted to avoid the inconveniences resulting from this conception (manufacture, dismantling), by creating a wheel having cooled rims.

This wheel is remarkable by the fact that its particular structure satisfies, in a very simple manner, both on the one hand, the requirements of housing the liquid mass in the position the most favorable for cooling, and, on the other hand, to the dismantling conditions of a compound wheel, as are, frequently, the wheels of aeroplanes of heavy tonnage.

According to the invention, the wheel is substantially constituted by the assemblage of a body with one or more rims that can be taken to pieces, capable of being fitted and secured on said body, said rims containing, at the interior thereof, annular chambers enclosing the cooling liquid and holding said liquid in direct contact on the entire extent of the brake drums.

The accompanying drawing illustrates, by way of example, a wheel having these characteristic features: The central body 1 will, preferably, be made of a light alloy, for instance a magnesium alloy.

The two rims which can be taken to pieces are constituted by two identical crowns 2—2 each forming a completely closed annular fluid-tight chamber 3—3, which will be filled with liquid, for instance water.

Said crowns will, preferably, be made of steel pig-iron or of any other pig-iron of favorable nature as regards the friction coefficient.

Said crowns are, in fact, machined so as to present, on the inner periphery thereof, a brake drum 4. They are advantageously provided with vanes 5 for promoting the dispersion of the heat generated in the midst of the liquid by the action of the brake shoes on said drums.

Of course, independent brake drums such as indicated at 2ª might be secured on the rims instead of being cast in one piece with the latter; the rims would then be made of light metal.

The assemblage of the rims with the central body can be effected by any suitable means, for instance, through the medium of tie-rods 8 having bearing heads 9 and nuts 10. Said tie-rods pass through combined holes formed in the rims and the central body.

Shearing rings, illustrated at 12, are interposed between said tie-rods and the members to be connected, astride the junction planes.

Stoppers 14 are provided for the filling up of the liquid chambers. Valves, not shown, might also be added to said chambers so that the pressure existing therein, owing to heating up and to the eventual vaporization of the liquid cannot reach excessive values.

Such a wheel can be taken to pieces with great facility. It ensures a rapid and substantial absorption of the heat generated in the region of the brake drums by the braking action, said heat being then dispersed in the atmosphere by the large metallic surface washed by the liquid.

Moreover, the assemblage of the three elements of the wheel is such that the expansions capable of differentially affecting said elements can take place freely.

It is to be understood that, in the outline of the wheel, the necessary precautions must be taken to satisfy the moulding requirements, particularly concerning continuous and completely closed annular chambers. For instance, the dismantling orifices will be obturated by stoppers 15 secured in position.

What I claim as my invention and desire to secure by Letters Patent is:

A wheel comprising an apertured first element forming a body, a second element forming a rim for supporting the tire, a brake drum on said second element, a chamber in the interior of said element and adapted to be filled with liquid, a third element similar to the second element and arranged symmetrically thereto with respect to the first element, the second and third elements having internal tubular members presenting bores aligned with the apertures of the first element, studs passing through the apertures and bores and uniting the three elements, and shearing rings at the junction of the second and third elements with the first element.

RENÉ LUCIEN LEVY.